United States Patent

Stoliker

[15] 3,682,266
[45] Aug. 8, 1972

[54] TRACK LAYING TRACTION UNIT FOR REPLACING A ROAD VEHICLE DRIVING WHEEL

[72] Inventor: Joseph F. Stoliker, La Grange, Ill.
[73] Assignee: Tri-Lok, Inc., Grayslake, Ill.
[22] Filed: Jan. 21, 1970
[21] Appl. No.: 4,531

[52] U.S. Cl............180/9.62, 180/9.2 C, 305/35 R, 305/49
[51] Int. Cl. ..........................................B62d 55/04
[58] Field of Search..........305/35, 47, 48, 49, 57, 54; 180/9.62, 9.2, 9.5

[56] References Cited

UNITED STATES PATENTS

| | | | |
|---|---|---|---|
| 2,294,409 | 9/1942 | Kohn | 305/55 |
| 425,662 | 4/1890 | Edwards | 305/49 |
| 1,458,962 | 6/1923 | Athey | 305/49 |
| 1,623,457 | 4/1927 | Athey | 305/49 |
| 2,053,088 | 9/1936 | Kuchar | 305/49 |
| 2,383,184 | 8/1945 | Frederickson | 305/49 |
| 2,467,947 | 4/1949 | Skelton | 180/9.62 X |
| 3,052,502 | 9/1962 | Lucas | 305/49 |
| 3,056,633 | 10/1962 | Lucas | 305/57 |

FOREIGN PATENTS OR APPLICATIONS

| 745,591 | 2/1933 | France | 305/54 |
|---|---|---|---|

Primary Examiner—Richard J. Johnson
Attorney—Burmeister, Palmatier & Hamby

[57] ABSTRACT

For reversible substitution in place of a driving wheel of a road vehicle, a track laying traction unit comprising an endless track trained around a sprocketed driving wheel attachable to the vehicle axle and two spaced support wheels on a frame detachably mountable on the vehicle axle housing. The track comprises an endless series of track shoes, each including a traction pad fixed to the central portion of a U-shaped support having spaced inwardly extending legs. The outer portions of the shoes on which the traction pads are located are swingably supported on pivots connecting successive links of an endless outer chain so that such links maintain a minimum spacing between the pads of adjacent shoes. The inner ends of the shoe legs are swingably connected to pivots that connect adjacent pairs of inner links, the two links of each such pair being independently pivoted together and defining cams that coact with the support and driving wheels to effect scissoring of the pairs of links to accommodate shortening of the space between the inner leg ends of adjacent shoes incident to movement of the shoes around the wheels. The shoes and the inner and outer links are fashioned economically from sheet metal stampings. Internally reinforced by sheet metal stampings, the traction pads can be readily replaced on the shoes after extensive usage.

7 Claims, 18 Drawing Figures

TRACK LAYING TRACTION UNIT FOR REPLACING A ROAD VEHICLE DRIVING WHEEL

This invention relates to self-propelled highway vehicles and is concerned with the mobility of such vehicles over soft terrain or road surfaces which on account of muddy, snowy or other adverse conditions are difficult to traverse by wheeled vehicles.

It is well known that track laying vehicles can traverse with ease and certainty surfaces over which passage by wheeled vehicles, even "four-wheel drive" vehicles, is difficult or impossible. However, the cost heretofore of road vehicles having track laying drives has been prohibitive, particularly for civilian purposes where the advantages of such track laying drive features would be most useful, but stringent limitations apply to the cost that can be justified in the purchase of such vehicles.

One object of the invention is to provide for detachable substitution in place of a drive wheel of a self-propelled road vehicle, which may be of small size, a new and improved track laying traction unit inherently well adapted for most economical manufacture and having highly desirable and efficient functional capabilities in use over most land surfaces including hard paved highways and soft off-road terrain that cannot be traversed by wheeled self-propelled vehicles.

A further object is to provide for use in place of the normal drive wheels of highway vehicles track laying traction units of the character recited that have good road speed capabilities.

A further object is to provide a track laying traction unit of the character recited having an improved low profile construction which has the same effective height, with respect to the driving axle, as a drive wheel such as is commonly used on lightweight self-propelled highway vehicles.

Another object is to provide a track laying traction unit as recited in the preceding objects which is so constructed that tension loads on the endless track are carried by endless, linked connecting chain with the consequence that the individual traction shoes incorporated in the track to engage the underlying support surface are continuously maintained basically free of tension load.

Another object is to provide a track laying traction unit as recited in which an endless series of individual traction shoes are swingably supported on the pivots connecting adjacent links of an outer endless chain and pivots connecting adjacent links of an inner endless chain in such manner that the structure of each traction shoe is maintained substantially free of forces transmitted to other shoes of the track by the support surface being traversed.

A related object is to provide a traction unit as recited in which each individual traction shoe is swingably supported on two pivots respectively forming pivots in adjacent links of inner and outer endless chains of links in the track.

Another object is to provide a track laying traction unit of the character recited in which track shoes incorporating elastomeric pads are formed economically from sheet metal stampings and supported swingably on inner and outer endless chains of links pivoted directly together and fashioned economically of sheet metal stampings.

A further object is to provide a track laying traction unit of the character recited in which traction shoes incorporating traction pads of elastomeric material internally reinforced by sheet metal stampings can be readily replaced after wear ensuing from extensive usage.

Another object is to provide for substitution in place of the drive wheels of a highway vehicle track laying traction unit in which endless traction tracks are driven by sprocket wheels substituted in place of the vehicle drive wheels and circulating around support wheels journalled on swingably frame structures detachably mountable on vehicle axle housings.

Other objects and advantages will become apparent from the following description of the exemplary embodiments of the invention illustrated in the drawings, in which:

Figures 1, 2, 3, 4:
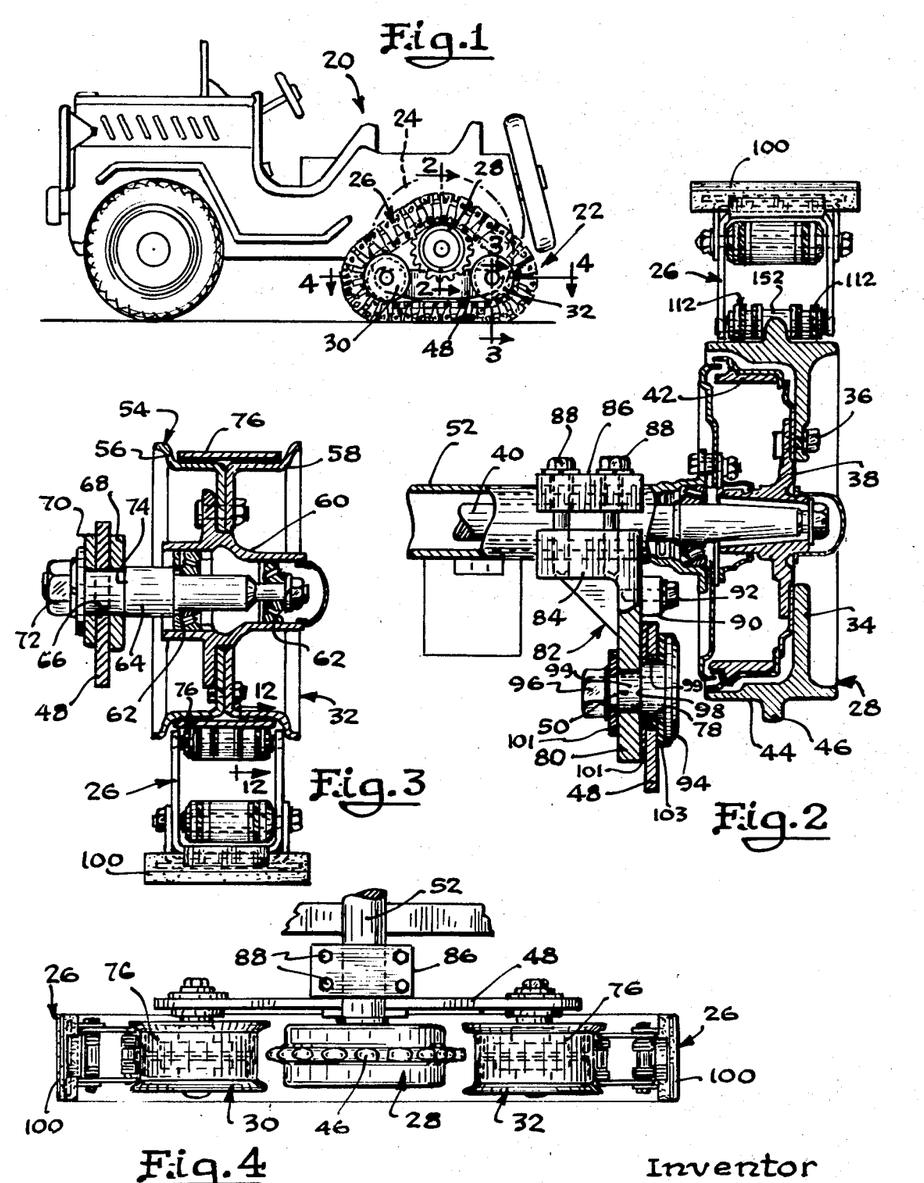
FIG. 1 is a side view of a road vehicle showing a track laying traction unit constructed in accordance with the invention substituted in place of a rear drive wheel, illustrated in phantom.
FIG. 2 is a transverse sectional view on an enlarged scale taken with reference to the line 2—2 in FIG. 1.
FIG. 3 is a sectional view on an enlarged scale taken with reference to the line 3—3 of FIG. 1.
FIG. 4 is a simplified sectional view on an enlarged scale taken generally with reference to the line 4—4 in FIG. 1.

As shown in FIG. 1, a self-propelled road vehicle typified by a small truck or passenger vehicle of the "four-wheel drive" type 20 is equipped with a pair of track laying traction units 22 constructed in accordance with the invention and reversibly substituted in place of the rear drive wheels 24 (illustrated in phantom in FIGS. 1 and 5) of the vehicle 20.

Figure 5:
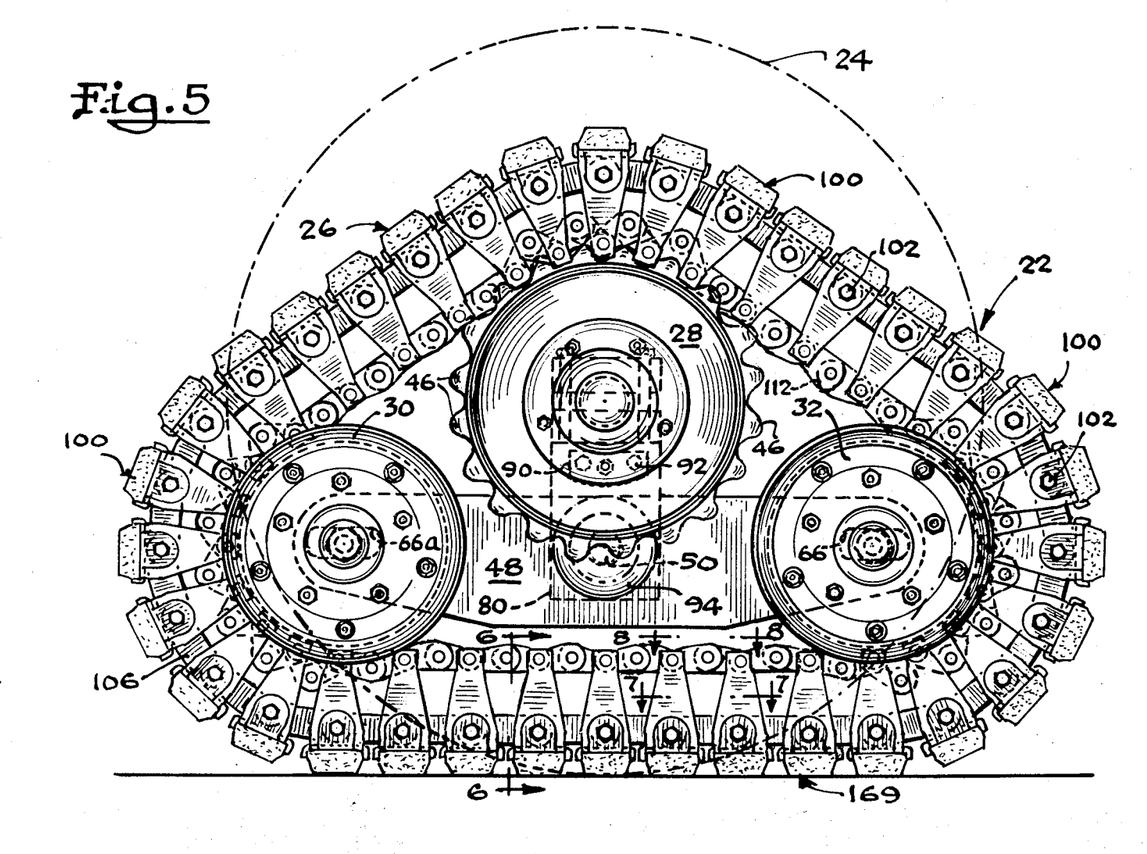
FIG. 5 is a general side view on an enlarged scale of the track unit of FIG. 1, the normal drive wheel replaced by the track unit being shown in phantom.

Each traction unit 22 comprises an endless flexible track 26 trained over a sprocketed drive wheel 28 and around a forward weight bearing or support wheel 30 and a rearward weight bearing or support wheel 32. The sprocketed drive wheel 28 has an inwardly extending annular support flange or web 34 that is adapted as shown in FIG. 2 to be secured removably by bolts 36 to the corresponding rotary drive hub 38 in place of the conventional drive wheel 24 which the hub 38 is designed to carry. The hub 38 is secured in a conventional fashion to the rear driving axle 40 of the vehicle and carries as shown a conventional brake drum 42.

The outer periphery 44 of the drive wheel 28 has a generally cylindrical shape, as shown in FIG. 2, designed to support the endless track 26 as will be described and defines in a medial location along its axial extent an annular series of circumferentially spaced sprockets or teeth 46 designed to mesh, as will be described, with the inner portion of the endless track to provide a nonslip driving connection with the track.

The forward and rearward weight bearing or support wheels 30, 32 are journalled on opposite ends of a longitudinally extending frame member 48, FIGS. 1, 4 and 5, pivotally supported for swinging movement in a vertical plane about a central pivot 50 disposed below the conventional rear axle housing 52 for the driving axle 40.

In the preferred construction illustrated, the medially pivoted and vertically swingable frame member 48 is fashioned economically as a segment of a flat plate of steel positioned as shown in edge in a vertical position and having opposite ends tapered upwardly from the lower side as shown in FIG. 5. The frame member 48 thus formed is economical to fashion and has inherently great strength to sustain the bending stress of upward forces applied to opposite ends of the frame member 48 by the support wheels 30, 32.

The two support wheels 30, 32 are identical in construction and similarly mounted on opposite ends of the vertically swingable support plate 48. The support wheel 32, for example, FIG. 3, comprises a flanged rim 54 fashioned in two segments 56, 58 formed as mirror images of each other and bolted to a central hub 60 journalled by bearings 62 on a stub axle 64 extending through a horizontal slot 66, FIGS. 3 and 5, formed in the adjacent end of the support plate 48. The stub axle 64 passes through two thick friction washers 68, 70 disposed on opposite sides of the support plate. A nut 72 on the inner end of the stub axle 64 is tightened against the inner washer 70 to draw an annular shoulder 74 on the stub axle 64 against the outer washer 68 to frictionally clamp the support plate 48 between the washers 68, 70 and thereby hold the stub axle 64 in a position preadjusted longitudinally within the slot 66 to maintain proper tension in the endless track 26.

As indicated, the forward support wheel 30 is similarly mounted on the plate 48, a horizontally extending mounting slot 66a within the forward end of the plate 48 corresponding to the mounting slot 66 in the rear end of the plate 48 and providing fore and aft adjustment of the forward support wheel 30 also for the purpose of adjusting the tension in the endless track 26.

An endless cylindrical ring or band 76 encircles the inner portions of the two annular segments 56, 58 of the support wheel 32, for example, as shown in FIG. 3, to directly contact and support the track 26 and resist wear of the track on the wheel.

The previously mentioned pivot 50, FIGS. 2 and 5, pivotally supporting the vertically swingable frame plate 48 near its center is formed by a pivot bolt also denoted by the number 50 extending through an opening 78 in the plate 48 and through the downwardly projecting portion 80 of a bracket denoted generally by the number 82.

As shown, the bracket 82 comprises a lower portion 84 embracing and extending downwardly from the underside of the axle housing 52 and an upper portion 86 embracing the upper side of the axle housing 52, the two bracket portions being connected by four cap screws 88 which tighten the bracket releasably in firm clamping engagement with the axle housing. Overswinging of the support frame plate 48 beyond normal functional limits is precluded by a stop plate 90, FIGS. 2 and 5, secured by cap screws 92 to the lower bracket portion 84 in spaced overlying relation to the upper edge of the frame plate 48.

It should be noted with reference to FIG. 2 that the pivot bolt 50 for the swingable frame plate 48 has an enlarged head 94 on its outer end which overlaps the plate 48 holding the plate movably against the downwardly extending portion 80 of the bracket 82. A nut 96 on the opposite end of the pivot bolt 50 is tightened against the inner face of the bracket portion 80 to draw an annular shoulder 98 on the pivot bolt fast against the bracket. Preferably, a bearing sleeve 99 and thrust washers 101, 103 are positioned between the plate 48 and pivot 50 as shown.

During seasons in which climatic conditions are such that usage of the traction units 22 is unnecessary, the vehicle may be operated with its regular rear drive wheels 24 in place. Conversion of the vehicle 20 to usage of the track units 22, when this is desirable, can be readily effected by removing the rear drive wheels 24 in the usual manner, mounting the sprocketed drive wheels 28 in place of the rear drive wheels 24, clamping the bracket 28 of each unit 22 to the rear axle housing 52 as illustrated, and training the endless track 26 of each unit around the three wheels 28, 30, 32 of the unit, the three wheels 28, 30, 32 being axially aligned in belting relation with each other so that the track fits around all three wheels simultaneously. After each endless track 26 is trained around its support wheels 28, 30, 32, the stub axles for the two rimmed, weight bearing wheels 30, 32 are adjusted outwardly along the coacting slots 66a, 66 to eliminate slack in the track.

The procedure is reversed to replace the rear drive wheels 24 when the track units 22 are not needed.

The endless traction track 26 comprises an endless series of traction shoes 100 swingably supported on outer pivots 102 connecting adjacent links 104 of outer endless chains 106 and are swingably supported on inner pivots 108 connecting adjacent pairs of links 110 of inner endless chains 112 in such manner that the structure of each shoe is maintained essentially free, as will presently appear, of stress incident to the application of support force to the adjacent shoes by the surface being traversed.

Fashioned economically from an elastomeric traction cushion and from metal stampings, as will be described, each traction shoe 100 comprises as shown best in FIGS. 6 and 9 a generally U-shaped basic part 114 having two parallel substantially flat legs 116, 118 extending inwardly from opposite ends of a straight and generally flat traction pad support segment 120 of the element 114. The inner ends of the support legs 116, 118 are narrowed to substantially one-half the transverse width of the pad support segment 120 as shown in FIG. 9, the medial portion of the support legs 116, 118 being narrowed progressively in an inward direction as illustrated.

Figures 6, 7, 8, 9, 10:
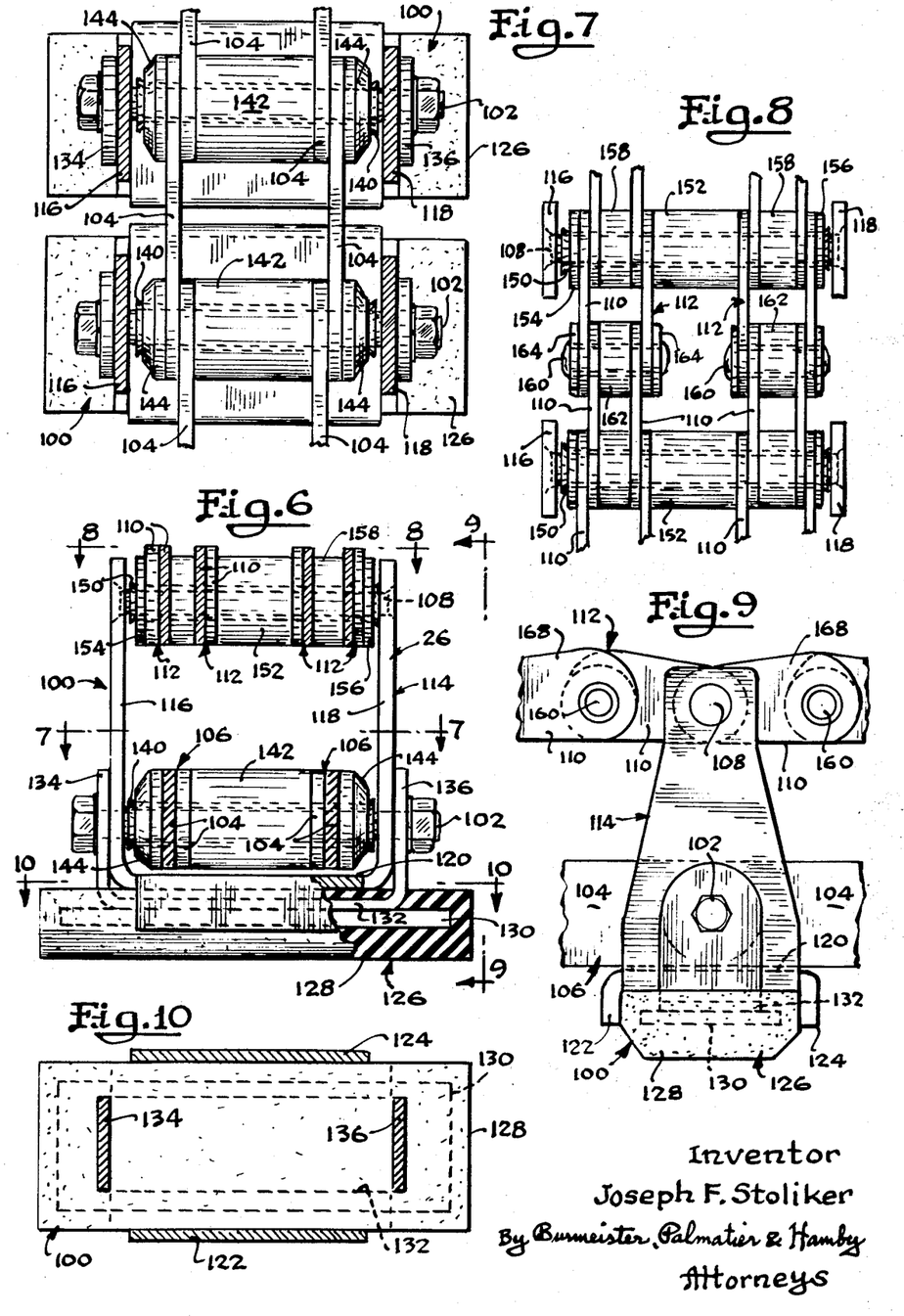
FIG. 6 is a transverse sectional view on an enlarged scale of the endless track taken generally with reference to the line 6—6 of FIG. 5.
FIG. 7 is a sectional view on an enlarged scale of a segment of the track taken with reference to the lines 7—7 in FIGS. 5 and 6.
FIG. 8 is a fragmentary view of a segment of the endless track taken with reference to the lines 8—8 in FIGS. 5 and 6.
FIG. 9 is a side view of a typical traction shoe and adjacent connecting links taken with reference to the line 9—9 in FIG. 6.
FIG. 10 is a sectional view of a typical traction shoe taken with reference to the line 10—10 in FIG. 6 and showing the inner face of the traction pad on the shoe.

The opposite longitudinal edges of each pad support segment 120 extend transversely in relation to the endless track 26 and are turned outwardly to form two parallel pad support flanges 122, 124 which embrace opposite longitudinal edges of a generally rectangular traction pad 126 fitted flat against the outer face of the pad support segment 120 as shown in FIGS. 6 and 9.

The traction pad 126 of each shoe comprises a generally rectangular cushion 128 of rubber or other suitable elastomeric material, such as may be readily provided by those skilled in the art, internally reinforced by a flat rectangular core 130 embedded within the cushion 128 as illustrated best in FIGS. 6, 9 and 10.

A U-shaped attachment fitting 132, adapted to be conveniently stamped from flat metal stock, has a central portion embedded in the traction cushion 128 and fixed by spot welds to the pad core 130 in parallel contact with the pad core as illustrated. Opposite ends of the attachment fitting 132 are turned inwardly to form two spaced parallel attachment ears 134, 136 mutually spaced to fit slidably into embracing relation to the support legs 116, 118 of the shoe as shown in FIGS. 6, 9 and 10.

The traction pad 128 is held against dislodgment from between the pad support flanges 122, 124 by the corresponding outer hinge pin or pivot 102, previously mentioned, which extends through the two traction pad ears 134, 136 and through the intervening support legs 116, 118 in parallel, inwardly spaced proximate relation to the pad support segment 120 as shown in FIGS. 6 and 9. The hinge pin or pivot 102 is formed preferably, as shown, by a bolt (also denoted by the number 102) that can be readily removed to release the corresponding traction pad 126 for convenient replacement of the pad after extensive usage, if desirable, the bolt being readily replaced with equal ease to secure the new pad in place.

Between the two corresponding support legs 116, 118 the outer hinge pin or pivot 102 of each shoe 100 extends through a cylindrical bushing or sleeve bearing 140. The central longitudinal portion of the bushing 104, FIG. 6, is closely encircled by a cylindrical roller 142 that functions as a longitudinal spacer between the two outer chains 106. At each end of the longitudinal spacer or roller 142 the two adjacent links 104 of the corresponding outer chain 106 are pivotally mounted on the bushing 140, the links 104 being formed preferably as metal stampings apertured at opposite ends to receive the bushings 140 of adjacent shoes 100.

Washers 144, FIGS. 6 and 7, are placed on the respective ends of the bushing 140 between the respective chains 106 and the corresponding support legs 116, 118 and the ends of the bushing or bearing 140 are upset as illustrated to hold the washers in slidable engagement with the adjacent outer chain links 104.

With the opposite ends of the bushing or bearing 140 upset as described to hold the washers 144 axially in place, the pivotal assembly consisting of the bearing 140, the spacer roller 142, the two washers 144 and the four adjacent links 104 of the two outer chains 106 will remain pivoted together as an assembly upon removal of the pivot bolt 102 as previously described for replacement of the traction pad 126 after extensive usage as this may be desired. This makes for convenient reassembly of the parts as the pivot bolt 102 can be readily inserted through the attachment ears 134, 136 and through the support legs 116, 118 and the sleeve bearing 140 to restore the original assembled condition of the parts, no realignment of the individual small parts being necessary.

It should be appreciated at this point that the flat links 104, preferably stamped from flat metal stock, as indicated, are pivotally interconnected by the bearing bushings 140 and the pivot bolts 102 in such fashion that tension forces are transmitted through the outer chains 106 along the endless track 26 independently of the structure of the shoes 100. The legs 116, 118 of the shoes 100 cause the outer chains 106 to bend around the wheels 28, 30, 32, but do not carry the load transmitted between adjacent outer chain links 104 pivotally connected together as described.

The inner ends of the two support legs 116, 118 of each shoe 100 carry the inner pivot or hinge pin 108, previously mentioned, disposed in inwardly spaced parallel relation to the outer pivot bolt 102 as shown in FIGS. 6 and 9.

Between the two support legs 116, 118, the outer hinge pin 108 is encircled by a bushing or sleeve bearing 150 which carries along its central longitudinal medial portion an encircling spacer roller 152 adapted to be engaged by the sprockets 46 of the drive wheel 28. Opposite ends of the bearing bushing 150 are upset against washers 154, 156 resting against adjacent links 110 of the two inner chains 112. Opposite ends of each inner hinge pin 108 are enlarged as by swaging to hold the pin in an axially fixed position relative to the support legs 116, 118.

Each of the two inner chains 112 is formed by two pairs of flat links 110 extending between the bearing bushings 150 on adjacent traction shoes 100 and being mutually pivoted together to scissor in relation to each other upon moving around the respective wheels 28, 30, 32 as shown in FIGS. 5, and 11 through 15. At each bearing bushing 150 the four adjacent links 110 of each inner chain 112 are pivoted to the bearing sleeve 150 internally reinforced by the pivot pin 108, the ends of the links 110 being apertured to receive the bearing bushing 150. A suitable spacer 158 encircles each bearing bushing 150 between the spaced adjacent links of each inner chain 112 as shown in FIG. 8.

As illustrated in FIGS. 8 and 9, each inner chain 112 interconnects each two adjacent hinge pins 108 by means of two pairs of flat metal links 110, the links of each pair being mutually pivoted together by a pivot pin 160 which functions as the pivot for both pairs of the links of the same chain. An annular spacer 162 encircles the pivot pin 160 between the two pairs of links pivoted on the pin 160 and end washers 164 are held against the adjacent ends of the pivoted links by enlarged outer ends of the pivot 160.

Figure 11:
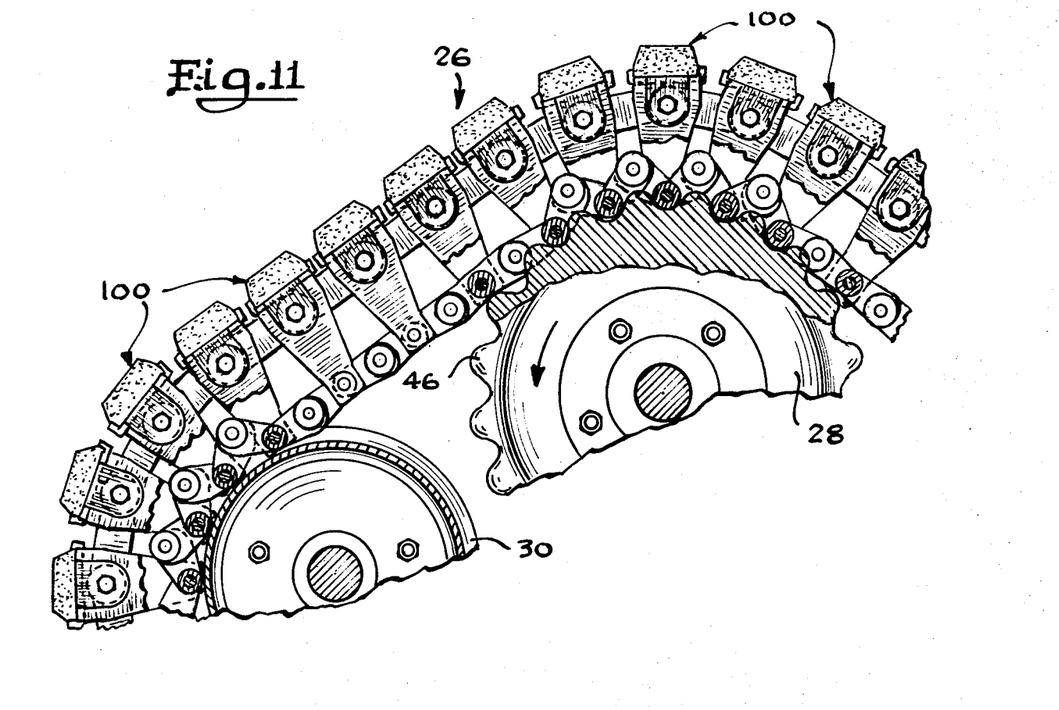
FIG. 11 is a fragmentary side view of the traction unit showing a segment of the endless traction track trained around a coacting support wheel and the sprocketed driving wheel, certain portions of the track and wheels being broken away to better reveal the relationship of underlying parts.
Figure 12:
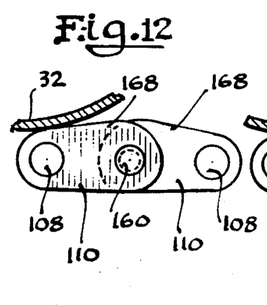
FIG. 12 is a fragmentary sectional view taken with reference to the line 12—12 in FIG. 3 and illustrating the position of a pivoted pair of links of inner connecting chain approaching a support wheel.
Figure 13:
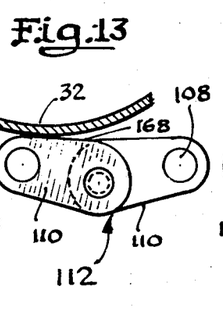
FIG. 13 is a view similar to FIG. 12 but illustrating the relative positions of the two links after contact with the support wheel has progressed somewhat to force initial scissoring of the links.
Figure 14:
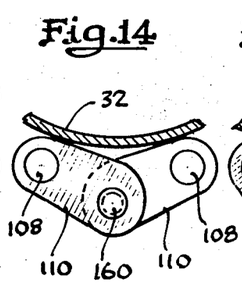
FIG. 14 is similar to FIG. 13 and illustrates a further scissoring of the links as progress around the support wheels continues.
Figure 15:
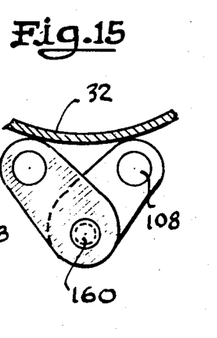
FIG. 15 is similar to FIG. 14, but illustrates a substantially complete scissoring of the links as the corresponding portion of the track swings around the support wheel.

The end of each inner chain link 110 pivoted to a coacting intermediate hinge pin 160 is enlarged radially with respect to the axis of the hinge pin 160 in an inwardly extending direction with respect to each successive wheel 28,30,32 about which the track 26 is trained to form an enlargement denoted in FIGS. 9 and 12 by the number 168 and referred to for convenience as a "cam". As the pairs of links 110 of the inner chains 112 enlarged as described to form the cams 168 pass around the peripheries of the respective wheels 28,30,32, the cams 168 are engaged by the periphery of each successive wheel, as illustrated in FIGS. 12 through 15, with respect to the wheel 32, to cam the corresponding intermediate pivot 160 so that each pair of links 110 scissors outwardly as illustrated in FIGS. 11 through 15 to accommodate reduction in the intervening space between the inner ends of the shoe legs 116, 118 incident to movement of the corresponding shoes around the coacting wheel.

It will be noted with reference to FIGS. 2 and 11 that the sprockets or teeth 46 on the drive wheel 40 fit between the between the two inner chains 112 to engage the driving rollers 152 encircling the inner pivot pins 108 between the two inner chains, as shown in FIG. 6, the engagement of the sprocketed wheel 28 with the driving rollers 152 thus providing a nonslip driving connection with the endless traction track 26.

It should be noted that, as in the case of the outer endless chains 106, the shoes 100 are swingably mounted on he inner pivots 108 between successive links 110 of the inner chains 112 in such manner that the load on each shoe is transmitted to the inner chains as well as to the outer chains 106 independently of the structure of the adjacent shoes.

The shoes 100 in the lower run 169 of the endless track 26 extending between the two weight bearing wheels 30, 32 are maintained in optimum engagement with the underlying support surface by a structural relationship of the parts which allows adequate flexing of the track to conform to the underlying support surface while at the same time precluding excessive upward bowing of the ground engaging lower run 169 of the track. Thus, as shown in FIG. 9, the outer edges of the links 104 of the outer chains 106 closely confront the inner faces or backsides of the pad support segments 120 of the shoes 100 in straight running segments of the track extending between the wheels. As a consequence, inward flexing of the lower run 169 of the track beyond a predetermined limited degree adequate for conforming of the track to the shape of the underlying surface is precluded by engagement of the outer links 104 with the backsides of the pad support segments 120 of the shoes.

As previously mentioned, the successive pairs of links 110 of the inner chains 112 scissor relative to each other as illustrated in FIGS. 11 through 15 during movement of the corresponding inner chain links around the individual wheels 28,30,32. It is fitting to point out, moreover, that the same scissoring of the paired links 110 of the inner chains 112 which accommodates contraction of the spaces between the inner ends of the legs 116, 118 of the successive shoes passing around the respective wheels 28,30,32 also permits to advantage a temporary lengthening of the inner periphery of the endless track 26 to permit passage between the inner periphery of the endless track and any of the three track supporting wheels of any foreign object such as may from time to time become caught between a wheel and the track moving around the wheel. This capability of the inner periphery of the track to expand when moving around a support wheel permits harmless passage of a foreign object between the track and the wheel and protects the unit from overstressing of structural components even though the individual parts as such are inelastic.

Figures 16, 17, 18:
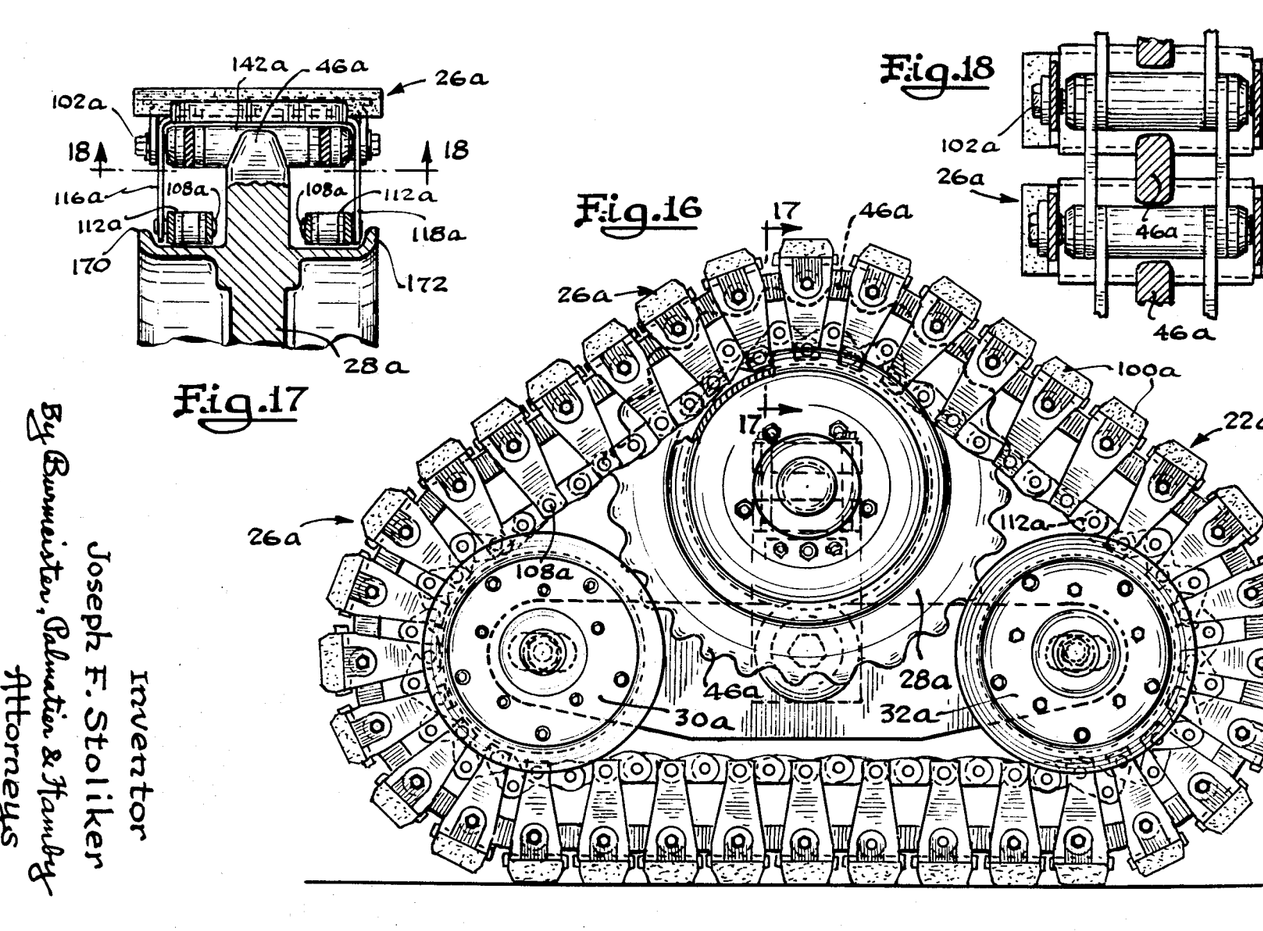
FIG. 16 is a side view similar to FIG. 5 but illustrating a modified construction of the track unit.
FIG. 17 is a fragmentary sectional view on an enlarged scale taken with reference to the line 17—17 of FIG. 16.
FIG. 18 is a fragmentary sectional view taken with reference to the line 18—18 of FIG. 17.

In this modified embodiment of the invention illustrated in FIGS. 16 through 18, component elements constituting counterparts of the previously described embodiment illustrated in FIGS. 1 through 15 are identified with the same reference numbers but with the addition of the suffix "a".

In the modified traction unit 22a illustrated in FIGS. 16 to 18, the sprocketed wheel 28a is enlarged somewhat in diameter and extends radially between the two inner chains 112a as shown in FIG. 17 so that the sprockets or teeth 46a engage the rollers 142a on the outer pivots 102a. In this modified form, each inner pivot pin 108 of the form previously described is replaced by two shorter coaxial pivot pins 108a pivotally connecting successive links of the respective inner chains 112a and being fixed individually to the respective legs 116a, 118a of the corresponding traction shoes 100a.

As shown in FIG. 17, the sprocketed wheel 28a is equipped with annular flanges 170, 172 which extend outwardly in embracing relation to the inner ends of the respective shoe support legs 116a, 118a to stabilize the overlying portion of the endless track 26a axially with respect to the sprocketed wheel 28a.

The invention is claimed as follows:

1. For detachable substitution in place of a drive wheel of a highway vehicle, a track laying traction unit comprising an elongated frame structure adapted to be detachably mounted on a vehicle axle housing to extend longitudinally in relation to the vehicle, a forward weight bearing wheel mounted rotatably on said frame structure, a rearward weight bearing wheel mounted rotatably on said frame structure in rearwardly spaced relation to said forward wheel, a sprocketed drive wheel adapted to be mounted on the vehicle axle to be rotated thereby, said wheels having a common axial alignment with each other, an endless traction track having a lower run disposed below said weight bearing wheels and extending therebetween, said track being trained around said weight bearing wheels and over said drive wheel, said track including an endless series of track shoes; each of said shoe comprising a U-shaped metal stamping forming a straight traction pad support and a pair of spaced parallel support legs extending inwardly from said pad support, an elastomeric traction pad fitted against the outer face of said pad support, a generally flat pad core formed as a sheet metal stamping and being imbedded in said pad, and two spaced attachment ears fixed to said pad core and extending in straddling relation to said support legs; said pad support of each shoe having two opposite marginal edges turned outwardly and forming flanges embracing opposite longitudinal edges of the corresponding pad, each shoe having an outer hinge pin extending through said pad attachment ears and the intervening support legs in proximate spaced parallel relation to the inner face of the pad support of the shoe, two outer spacer links formed as metal stampings and swingably disposed adjacent each support leg of each shoe and pivotally connecting said outer hinge pin on the corresponding shoe with the corresponding pins of the two adjacent shoes.

2. For detachable substitution in place of a traction wheel of a road vehicle, a track laying traction unit comprising an elongated frame structure adapted to be detachably mounted on a vehicle chassis to extend longitudinally in relation to the vehicle, a forward weight bearing wheel mounted rotatably on said frame structure, a rearward weight bearing wheel mounted rotatably on said frame structure in rearwardly spaced relation to said forward wheel, a drive wheel adapted to be mounted on the vehicle axle to be rotated thereby, said wheels being axially aligned in belting relation to each other, an endless traction track having a lower run disposed below said weight bearing wheels and extending therebetween, said track being trained around said weight bearing wheels and over said drive wheel to be driven by the latter, said track including an endless series of track shoes, each of said shoes comprising a U-shaped metal element forming a traction pad support and a pair of spaced support legs extending inwardly from said pad support, a traction pad formed of a resilient material and being secured to said pad support to face outwardly, each shoe having an outer hinge pin extending through said support legs thereof in proximate spaced parallel relation to the corresponding pad support, two outer spacer links formed as metal stampings and swingably disposed adjacent each support leg of each shoe and pivotally connecting said outer hinge pin on the corresponding shoe with the corresponding pin of the two adjacent shoes, each shoe having an inner hinge pin extending through the inner ends of the two support legs of the shoe in inwardly spaced relation to the corresponding outer hinge pin for that shoe, and a plurality of pairs of inner links hinged together to scissor in relation to each other, the inner hinge pin of each shoe and the inner hinge pin of each adjacent shoe being pivotally interconnected by one of said hinged pair of inner links so that the inner links connecting the inner ends of the legs of the several shoes can scissor in relation to each other to accommodate shortening of the space between the inner hinge pins of adjacent shoes as an incident to movement of the shoes around said respective wheels.

3. For detachable substitution in place of a drive wheel of a highway vehicle, a track laying traction unit comprising an elongated frame structure adapted to be detachably mounted on a vehicle axle housing to extend longitudinally in relation to the vehicle, a forward weight bearing wheel mounted rotatably on said frame structure, a rearward weight bearing wheel mounted rotatably on said frame structure in rearwardly spaced relation to said forward wheel, a sprocketed drive wheel adapted to be mounted on the vehicle axle to be rotated thereby, said wheels having a common axial alignment with each other, an endless traction track trained around said wheels, said track including an endless series of track shoes; each of said shoes comprising a U-shaped metal stamping forming a generally straight traction pad support and a pair of spaced parallel support legs extending inwardly from said pad support, a traction pad fitted against the outer face of said pad support and including an elastomeric traction cushion and a generally flat pad core formed as a metal stamping and being imbedded in said cushion, and two spaced attachment ears fixed to said pad core and extending in straddling relation to said support legs; said pad support of each shoe having two opposite marginal edges turned outwardly and forming flanges embracing opposite longitudinal edges of the corresponding pad, each shoe having an outer hinge pin extending through said pad attachment ears and the intervening support legs in proximate inwardly spaced relation to the pad support of the shoe, an endless outer chain having overlapping links each connected pivotally at opposite ends to the outer hinge pins of two adjacent shoes, each shoe having an inner hinge pin extending through the inner ends of the two support legs of the shoe in inwardly spaced relation to the corresponding outer hinge pin for that shoe, and an inner chain having a succession of links pivotally connected to each other and pivotally connected to the inner hinge pins of successive shoes to limit the maximum spacing therebetween and allow shortening of the space between the inner hinge pins of adjacent shoes as an incident to movement of the shoes around said respective wheels.

4. For detachable substitution in place of a traction wheel of a road vehicle, a track laying traction unit comprising an elongated frame member adapted to extend longitudinally in relation to the vehicle, a forward weight bearing wheel mounted rotatably on said frame member, a rearward weight bearing wheel mounted rotatably on said frame member in rearwardly spaced relation to said forward wheel, a drive wheel adapted to be mounted on the vehicle axle to be rotated thereby, a frame bracket adapted to be detachably clamped to the vehicle axle housing, a pivot pivotally connecting said bracket to a medial portion of said frame member to pivotally support the latter for vertical swinging movement about a horizontal axis, an endless traction track trained around said weight bearing wheels and over said drive wheel to be driven by the latter, said track including an endless series of traction shoes, each of said shoes comprising a U-shaped metal element forming a traction pad support and a pair of spaced support legs extending inwardly from said pad support, a traction pad supported on each pad support to face outwardly, each shoe having an outer hinge pin extending through said support legs thereof in proximate inwardly spaced relation to the corresponding pad support, an endless outer chain having overlapping links individually pivoted at opposite ends to the outer hinge pins of successive shoes, an endless succession of pairs of inner links hinged together to scissor in relation to each other, and a succession of inner pivots mounted on successive shoes in inwardly spaced relation to said outer hinge pins thereon and pivotally connecting to the respective shoes and to each other adjacent links of successive pairs of said inner links so that the pairs of inner links pivoted together by said inner pivots form an endless inner chain connecting the shoes, the inner links of successive pairs scissoring to accommodate shortening of the spaces between the inner ends of successive shoes as an incident to movement of the shoes around said wheels.

5. For detachable substitution in place of a traction wheel of a road vehicle, a track laying traction unit comprising an elongated frame structure adapted to be detachably mounted on a vehicle chassis to extend longitudinally in relation to the vehicle, a forward weight bearing wheel mounted rotatably on said frame structure, a rearward weight bearing wheel mounted rotatably on said frame structure in rearwardly spaced relation to said forward wheel, a drive wheel adapted to be mounted on the vehicle axle to be rotated thereby, an endless traction track having a lower run disposed below said support wheels and extending therebetween, said track being trained around said support wheels and over said drive wheel to be driven by the latter, said track including an endless series of track shoes, each of said shoes comprising a traction element for engaging the ground and two spaced shoe supports extending inwardly from said traction element, two endless outer chains disposed in spaced parallel relation to each other, each outer chain having successive links overlapping each other and being pivoted together by outer bushings disposed respectively between said shoe supports of successive shoes, each shoe having an outer hinge pin supported on the corresponding shoe supports and extending therebetween through the corresponding outer bushing to pivotally support the bushing and adjacent outer chain links on the shoe; two endless, dual inner chains each comprising a succession of dual pairs of inner links, the two links of each pair of inner links being hinged together to scissor in relation to each other, adjacent links of the successive pairs of inner links overlapping each other and being mutually pivoted together by inner bushings located inwardly of said outer bushings and being disposed respectively between said shoe supports of successive shoes, and each shoe having an inner hinge pin supported on the corresponding shoe supports and extending therebetween through the corresponding inner bushing to pivotally support the inner bushing and adjacent inner chain links on the shoe.

6. For detachable substitution in place of a traction wheel of a road vehicle, a track laying traction unit comprising an elongated frame structure adapted to be detachably mounted on a vehicle chassis to extend longitudinally in relation to the vehicle, a forward weight bearing wheel mounted rotatably on said frame structure, a rearward weight bearing wheel mounted rotatably on said frame structure in rearwardly spaced relation to said forward wheel, a drive wheel adapted to be mounted on the vehicle axle to be rotated thereby, said wheels being axially aligned in belting relation to each other, an endless traction track having a lower run disposed below said weight bearing wheels and extending therebetween, said track being trained around said weight bearing wheels and over said drive wheel to be driven by the latter, said endless track including a plurality of endless outer chains each composed of an endless succession of links having overlapping ends mutually pivoted together, said track including an endless series of track shoes which are individually mounted on and supported by said endless chains, each of said shoes comprising a U-shaped metal element forming a traction pad support and a pair of spaced support legs extending inwardly from said pad support, a traction pad formed of a resilient material and being secured to said pad support to face outwardly, each shoe having an outer hinge pin extending through said support legs thereof in proximate spaced parallel relation to the corresponding pad support, two chain links swingably disposed near each support leg of each shoe and having mutually overlapping ends pivotally connected together by said hinge pin on the corresponding shoe and having opposite ends pivotally connected with the ends of similar links by the corresponding pins of the two adjacent shoes so that the chain links near each shoe support leg from components of one of said endless outer chains and the hinge pins support the shoes on the chain and pivotally connect adjacent chain links to each other to form the chain, an endless inner chain comprising a succession of dual pairs of inner links, the two links of each pair of inner links being hinged together to scissor in relation to each other, adjacent links of successive pairs of inner links overlapping each other, and a support leg of each shoe having thereon an inner pivot located inwardly of the corresponding outer hinge pin and extending through the overlapping links of adjacent pairs of the inner links so that the hinged pairs of inner links are pivoted together in endless succession to form said endless inner chain with said track shoes pivoted thereto by said inner pivots, said track shoes being interconnected only through inner and outer chain links.

7. A vehicle support unit comprising an elongated frame structure for mounting on a vehicle to extend longitudinally in relation to the vehicle, a forward track support wheel mounted rotatably on said frame structure, a rearward track support wheel mounted rotatably on said frame structure in rearwardly spaced relation to said forward wheel, an endless track trained around said support wheels to circulate therearound to traverse the ground, said track including a plurality of endless outer chains each comprosed of an endless succession of chain links having overlapping ends mutually pivoted together, said track including an endless series of track shoes which are individually mounted on and supported by said endless chains, each of said shoes comprising a weight bearing element for engaging the ground and having a support element extending inwardly from the weight bearing element, the support element of each shoe having thereon an outer pivot, two chain links swingably disposed near each shoe and having mutually overlapping ends pivotally connected together by said pivot on the corresponding shoe and having opposite ends pivotally connected with the ends of similar links by the corresponding pivots on the two adjacent shoes so that the two chain links form components of one of said endless chains and the pivots on the respective shoes support the shoes on the chain and pivotally connect adjacent chain links to each other to form the outer chain, an endless inner chain comprising a succession of dual pairs of inner links, the two links of each pair of inner links being hinged together to scissor in relation to each other, adjacent links of the successive pairs of inner links overlapping each other, and said support element of each shoe having thereon an inner pivot located inwardly of the corresponding outer pivot and extending through the overlapping links of adjacent pairs of the inner links so that the hinged pairs of inner links are pivoted together in endless succession to form said endless inner chain with said track shoes pivoted thereto by said inner pivots, said track shoes being interconnected only through inner and outer chain links.

* * * * *